US007775052B2

(12) United States Patent
Cornwell et al.

(10) Patent No.: US 7,775,052 B2
(45) Date of Patent: Aug. 17, 2010

(54) ACTIVE COMBUSTION CONTROL SYSTEM FOR GAS TURBINE ENGINES

(75) Inventors: Michael D. Cornwell, Bloomington, MN (US); Douglas C. Myhre, Eden Prairie, MN (US); O. Harald Eriksen, Minneapolis, MN (US); Jerry L. Goeke, West Des Moines, IA (US)

(73) Assignees: Delavan Inc, West Des Moines, IA (US); Rosemount Aerospace Inc., Burnsville, MN (US)

( * ) Notice: Subject to any disclaimer, the term of this patent is extended or adjusted under 35 U.S.C. 154(b) by 881 days.

(21) Appl. No.: 11/601,301

(22) Filed: Nov. 17, 2006

(65) Prior Publication Data

US 2007/0119147 A1    May 31, 2007

Related U.S. Application Data

(63) Continuation-in-part of application No. 11/210,095, filed on Aug. 23, 2005, now Pat. No. 7,484,369, which is a continuation-in-part of application No. 10/841,765, filed on May 7, 2004, now Pat. No. 7,334,413.

(51) Int. Cl.
*F02C 7/00*    (2006.01)
(52) U.S. Cl. .......................................... 60/803; 60/740
(58) Field of Classification Search .................. 60/803, 60/740, 39.281, 741, 742, 746, 747, 39.24, 60/39.27; 431/13, 14, 79; 356/43, 44
See application file for complete search history.

(56) References Cited

U.S. PATENT DOCUMENTS 2,468,584 A    4/1949    Wotring
2,975,785 A    3/1961    Sheldon (Continued)

FOREIGN PATENT DOCUMENTS

EP    0 638 770 A1    2/1995

(Continued)

OTHER PUBLICATIONS

Hermann et al.; "Active Instability Control (AIC) of Spray Combustors by Modulation of the Liquid Fuel Flow Rate"; Combust. Sci. and Tech., 1996, vol. 118, pp. 1-25.

(Continued)

*Primary Examiner*—Michael Cuff
*Assistant Examiner*—Vikansha S Dwivedi
(74) *Attorney, Agent, or Firm*—Scott D. Wofsy; Edwards Angell Palmer & Dodge LLP (57) ABSTRACT

A system is disclosed for actively controlling combustion in a gas turbine engine, which includes a fuel injector for issuing fuel into a combustion chamber of the gas turbine engine. The fuel injector has a dynamic pressure sensor for measuring acoustic pressure within the combustion chamber and a flame sensor for observing flame characteristics within the combustion chamber. The system further includes a high speed valve assembly for controlling flow of fuel to the injector and an electronic controller associated with the fuel injector for commanding the valve assembly to deliver fuel to the fuel injector at a commanded flow rate, based upon input from the sensors in the fuel injector.

29 Claims, 6 Drawing Sheets

U.S. PATENT DOCUMENTS

| | | | |
|---|---|---|---|
| 3,352,155 | A | 11/1967 | Penet |
| 3,532,121 | A | 10/1970 | Sturman et al. |
| 3,689,773 | A | 9/1972 | Wheeler |
| 3,762,442 | A | 10/1973 | Paul |
| 3,772,540 | A | 11/1973 | Benson |
| 4,521,088 | A | 6/1985 | Masom |
| 4,709,155 | A | 11/1987 | Yamaguchi et al. |
| 4,976,227 | A | 12/1990 | Draper |
| 5,051,631 | A | 9/1991 | Anderson |
| 5,071,105 | A | 12/1991 | Donze et al. |
| 5,257,496 | A | 11/1993 | Brown et al. |
| 5,303,684 | A | 4/1994 | Brown et al. |
| 5,404,709 | A | 4/1995 | Mac Lean et al. |
| 5,474,234 | A | 12/1995 | Maley |
| 5,488,340 | A | 1/1996 | Maley et al. |
| 5,608,515 | A | 3/1997 | Shu et al. |
| 5,784,300 | A | 7/1998 | Neumeier et al. |
| 5,791,889 | A | 8/1998 | Gemmen et al. |
| 5,797,266 | A | 8/1998 | Brocard et al. |
| 5,809,769 | A | 9/1998 | Richards et al. |
| 5,828,797 | A | 10/1998 | Minott et al. |
| 5,857,320 | A | 1/1999 | Amos et al. |
| 5,961,314 | A | 10/1999 | Myhre et al. |
| 6,058,709 | A | 5/2000 | Richards et al. |
| 6,059,560 | A | 5/2000 | Richards et al. |
| 6,142,665 | A | 11/2000 | Haffner et al. |
| 6,205,764 | B1 | 3/2001 | Hermann et al. |
| 6,205,765 | B1 | 3/2001 | Iasillo et al. |
| 6,244,291 | B1 | 6/2001 | Hughes |
| 6,454,548 | B2 | 9/2002 | Falk et al. |
| 6,517,045 | B1 | 2/2003 | Northedge |
| 6,566,158 | B2 | 5/2003 | Eriksen et al. |
| 6,598,621 | B1 | 7/2003 | Wygnanski |
| 6,640,548 | B2 | 11/2003 | Brushwood et al. |
| 6,672,071 | B2 | 1/2004 | Woltmann |
| 6,688,534 | B2 | 2/2004 | Bretz |
| 6,773,951 | B2 | 8/2004 | Eriksen et al. |
| 6,848,667 | B1 | 2/2005 | Wygnanski |
| 6,918,569 | B2 | 7/2005 | Jansen |
| 6,928,878 | B1 | 8/2005 | Eriksen et al. |
| 7,004,449 | B2 | 2/2006 | Jansen |
| 7,007,661 | B2 | 3/2006 | Warlick |
| 7,334,413 | B2 * | 2/2008 | Myhre .......... 60/803 |
| 7,484,369 | B2 * | 2/2009 | Myhre .......... 60/803 |
| 2002/0125336 | A1 | 9/2002 | Bretz |
| 2002/0134138 | A1 | 9/2002 | Philipp et al. |
| 2003/0056490 | A1 | 3/2003 | Anderson et al. |
| 2003/0056517 | A1 | 3/2003 | Brushwood et al. |
| 2003/0155031 | A1 | 8/2003 | Barton et al. |
| 2004/0154300 | A1 | 8/2004 | Woltmann |
| 2005/0107942 | A1 | 5/2005 | Nomura et al. |
| 2005/0180699 | A1 | 8/2005 | Shu et al. |
| 2005/0189021 | A1 | 9/2005 | Wygnanski |
| 2005/0247066 | A1 | 11/2005 | Myhre |
| 2006/0000219 | A1 | 1/2006 | Myhre |
| 2006/0213200 | A1 | 9/2006 | Critchley et al. |
| 2006/0219968 | A1 | 10/2006 | Jansen |
| 2007/0151252 | A1 | 7/2007 | Cornwell et al. |
| 2008/0000214 | A1 | 1/2008 | Kothnur et al. |
| 2009/0013693 | A1 | 1/2009 | Ols et al. |
| 2009/0026398 | A1 | 1/2009 | Overman et al. |

FOREIGN PATENT DOCUMENTS

| | | |
|---|---|---|
| EP | 0 816 760 A1 | 1/1998 |
| EP | 0 926 325 A2 | 6/1999 |
| EP | 1 559887 A2 | 8/2005 |
| GB | 2 342 504 | 4/2000 |
| GB | 2 342 782 | 4/2000 |
| GB | 2 377 555 | 1/2003 |
| GB | 2 380 064 A | 3/2003 |
| GB | 2 380 065 A | 3/2003 |
| JP | 08-68573 | 3/1996 |
| WO | WO 99/30006 | 6/1999 |
| WO | WO 00/20786 | 4/2000 |
| WO | WO 02/086364 A1 | 10/2002 |
| WO | WO 03/102454 A | 12/2003 |
| WO | WO 2005/047670 A2 | 5/2005 |
| WO | WO 2005/047670 A3 | 5/2005 |

OTHER PUBLICATIONS

Paschereit et al.; "Acoustic Control of Combustion Instabilities and Emissions in a Gas-Turbine Combustor"; Proceedings of the 1998 IEEE.

Haile et al.; "Characterization of a Liquid Fuel Injector under Continuous and Modulated Flow Conditions"; Part. Part. Syst. Charact. 15 (1998) 136-144.

Cohen et al.; "Active Control of Combustion Instability in a Liquid-Fueled Low-N0x Combustor"; Journal of Engineering for Gas Turbines and Power, Apr. 1999, vol. 121/281.

Heising et al.; "Periodic Liquid Fuel Sprays Combustion Processes and Their Damping of Combustion Instabilities"; American Institute of Aeronautics and Astronautics, 1999.

Johnson et al.; "Effects of Time Delay and System Noise Upon Active Control of Unstable Combustors"; American Institute of Aeronautics and Astronautics, 2001-0778.

Murugappan et al.; "Application of Extremum Seeking Controller for Suppression of Combustion Instabilities in Spray Combustion"; American Institute of Aeronautics and Astronautics, 2000-1025.

Magill et al.; "Combustion Dynamics and Control in Liquid-Fueled Direct Injection Systems"; American Institute of Aeronautics and Astronautics, 2000-1022.

Darling et al.; "Demonstration of Active Control of Combustion Instabilities on a Fuel-Scale Gas Trubine Combustor"; ASME Turbo Expo 2001, Jun. 4-7, 2001.

Wu et al.; "High Response Valve for Active Combustion Control"; Proceedings of ASME Turbo Expo 2001, Jun. 4-7, 2001.

Johnson et al.; "Demonstration of Active Control of Combustion Instabilities on a Full-Scale Gas Turbine Combustor"; American Society of Mechanical Engineers, Apr. 11, 2002.

Hoff, et al., Closed-Loop Combustion Control using OH Radical Emissions, Proceedings of ASME TURBOEXPO 2000, May 8-11, 2000, Munich Germany.

Natural Gas Fuel for General Electric Aircraft Derivative Gas Turbines in Industrial Applications, General Electric Company Marine & Industrial Engine Projects Department, Cincinnati, Ohio 45215, MID-TD-0001-1, Aug. 1985.

U.S. Appl. No. 11/895,196, Spivak et al.
U.S. Appl. No. 12/116,928, Goeke et al.
U.S. Appl. No. 12/195,895, Cornwell et al.
U.S. Appl. No. 12/046,977, Williams et al.
U.S. Appl. No. 11/652,718, Myhre.

J.E. May; "Active Pattern Factor Control for Gas Turbine Engines", Published 1998 NASA. Available from http://www.grc.nasa.gov/WWW/RT/RT1997/5000/5540may.htm , Apr. 15, 1998 [cited based on URL content as of Jul. 9, 2009].

U.S. Appl. No. 12/368,472, Goeke et al.

* cited by examiner

ACTIVE COMBUSTION CONTROL SYSTEM FOR GAS TURBINE ENGINES

CROSS-REFERENCE TO RELATED APPLICATIONS

The subject application is a continuation-in-part of U.S. application Ser. No. 11/210,095, filed on Aug. 23, 2005, now U.S. Pat. No. 7,484,369 which is a continuation-in-part of U.S. application Ser. No. 10/841,765, filed on May 7, 2004, now U.S. Pat. No. 7,344,413 the disclosures of which are herein incorporated by reference in their entireties.

BACKGROUND OF THE INVENTION

1. Field of the Invention

The subject invention is directed to gas turbine engines, and more particularly, to a system for actively controlling the combustion process in gas turbine engines to maintain combustion stability and optimize engine performance.

2. Background of the Related Art

Combustion instability is a significant problem in the design of low-emission, high performing combustion chambers for gas turbines. Combustion instability diminishes engine system performance, and the vibrations resulting from pressure oscillations can damage hardware components, including the combustion chamber itself. Combustion instability is generally understood as high amplitude pressure oscillations that occur as a result of the unstable coherent flow structures that develop from the turbulent nature of the combustion process and the large volumetric energy release within the combustion chamber. Moreover, when the combustion heat release becomes in phase with and reinforces acoustic pressure waves, a thermo-acoustic instability results.

In the past, passive control methods were employed to correct combustion instability, including, for example, modifying the fuel injection distribution pattern, or changing the shape or capacity of the combustion chamber. Passive controls are often costly and limit combustor performance. More recently, active control methods have been used to correct combustion instability by modifying the pressure within the system. This is done by sensing the amplitudes and frequencies of acoustic pressure waves, and then modulating fuel injection at the same frequencies but out of phase with the instabilities.

Currently, fuel injector flow rates are controlled by changing the fuel pressure feeding a common fuel manifold, with no individual control to each of the fuel injectors. Combustion stability could be achieved more effectively with active controls, if fuel flow could be modulated or pulsed at each fuel injector individually.

It would be beneficial therefore, to provide a combustion control system for gas turbine engines that is designed to command pulsed fuel flow to individual fuel injectors, so as to stabilize combustion and optimize engine performance.

SUMMARY OF THE INVENTION

The subject invention is directed to a new and useful system for actively controlling combustion in a combustion chamber of a gas turbine engine. The system includes at least one fuel injector for issuing fuel into a combustion chamber of a gas turbine engine. The fuel injector includes a dynamic pressure sensor for measuring acoustic-pressure differentials within the combustion chamber and a flame sensor for observing flame characteristics within the combustion chamber.

The system further includes a valve assembly for controlling the flow of fuel to the injector and an electronic controller operatively associated with the fuel injector for commanding the valve assembly to deliver fuel to the fuel injector at a commanded flow rate, based upon input from the sensors of the fuel injector. Preferably, the valve assembly is adapted and configured to modulate the fuel flow rate within a predefined range, about an average fuel flow rate.

Preferably, the system includes a plurality of fuel injectors, and at least one of the fuel injectors includes a dynamic pressure sensor and a flame sensor. Alternatively, each of the fuel injectors in the system includes a dynamic pressure sensor and a flame sensor. The system preferably includes a plurality of valve assemblies, and each valve assembly is operatively associated with at least one fuel injector. Alternatively, each of the fuel injectors has a respective valve assembly operatively associated therewith.

In accordance with a preferred embodiment of the subject invention, the fuel injector includes an injector body having a nozzle for issuing atomized fuel into the combustion chamber of the gas turbine. It is envisioned that the location of the dynamic pressure sensor can vary depending upon the engine application or other factors that will be readily apparent to those skilled in the art. In one embodiment of the subject invention, the dynamic pressure sensor is disposed within the nozzle. In another embodiment of the subject invention, the dynamic pressure sensor is mounted on or otherwise operatively connected to the injector body. In either location, the dynamic pressure sensor is adapted and configured to detect thermo-acoustic pressure oscillations in the combustion chamber. Preferably, the dynamic pressure sensor is in the form of a piezoelectric dynamic pressure sensor. Importantly, the dynamic pressure sensor is supported within a protective enclosure that is adapted for high temperature operation within the combustion chamber of a gas turbine engine.

The flame sensor preferably includes an optical sensor array disposed within the nozzle. The optical sensor array is adapted and configured to detect spectral characteristics of the combustor flame downstream from the nozzle. The optical sensor array is also adapted and configured to detect thermal characteristics of the combustor flame downstream from the nozzle. In one embodiment of the subject invention, the optical sensor array includes at least one and preferably a plurality of optical fiber bundles disposed within the nozzle. In another embodiment of the subject invention, the optical sensor array includes at least one and preferably a plurality of light guide rods extending from a surface of the nozzle. The light guide rods can be formed from sapphire, quartz or other similar glasses.

The system can include a fuel flow sensor disposed within the injector for measuring a rate of fuel flow through the injector. It is also envisioned that the system can include a sensor interface disposed within the injector for receiving input signals or data from the sensors. Preferably, the sensor interface is adapted and configured to communicate with the electronic controller. Those skilled in the art will readily appreciate that various modes of communication can be employed, such as, for example, inductive coupling means for communicating with the sensors. The sensor interface also includes digital communication means for communicating with the electronic controller.

The subject invention is also directed to a new and useful instrumented fuel injector for issuing fuel into a combustion chamber of a gas turbine engine. The fuel injector includes an injector body having an inlet end portion for receiving fuel from a fuel source and an outlet end portion for issuing atomized fuel into the combustion chamber of a gas turbine engine. More particularly, the injector body includes a feed arm that extends from the inlet end portion and a fuel nozzle that extends from a lower end of the feed arm.

A dynamic pressure sensor for measuring acoustic pressure differentials within the combustion chamber is operatively associated with the injector body and is either positioned on the feed arm upstream of the combustion chamber or within the fuel nozzle. In addition, a flame sensor or optical sensor array is disposed within the fuel nozzle of the injector body for observing flame characteristics within the combustion chamber.

The fuel injector further includes a valve assembly operatively associated with the inlet portion of the injector body for controlling the flow of fuel to the nozzle portion. A fuel flow sensor may be disposed within or proximate to the nozzle body for measuring a rate of fuel flow through the injector, and a sensor interface may be provided for receiving input signals or data from the sensors. The sensor interface includes means for communicating with the sensors and digital communication means for communicating with an electronic controller.

These and other aspects of the active combustion control system and the instrumented fuel injector of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to employ the active combustion control system of the present invention, embodiments thereof will be described in detail hereinbelow with reference to the drawings, wherein.

DETAILED DESCRIPTION OF THE PREFERRED EMBODIMENTS

Gas turbine engines typically have sensors for measuring operating conditions, including, for example, turbine inlet temperature, compressor speed and pressure, total fuel flow rate to the combustor, and exhaust gas temperature and pressure. In the active combustion control system of the subject invention, additional measurements are needed to fine-tune engine performance. These include thermo-chemical characteristics of the combustor flame, oscillating pressure changes that are indicative of combustion instability, and, in some instances, fuel flow rate at one or more fuel injectors delivering fuel to the combustion chamber of the engine.

The active combustion control system of the subject invention is primarily designed to reduce thermo-acoustic combustion instabilities within the combustion chamber of a gas turbine engine. The system is particularly well suited for use in combustion systems that are inherently unstable such as, for example, industrial gas turbine engines wherein lean premixed combustion is used to reduce NOx, civil aircraft that operate lean at high pressure ratios and high power thrust augmented military aircraft engines (afterburners) which utilize locally rich combustion.

Figure 1:
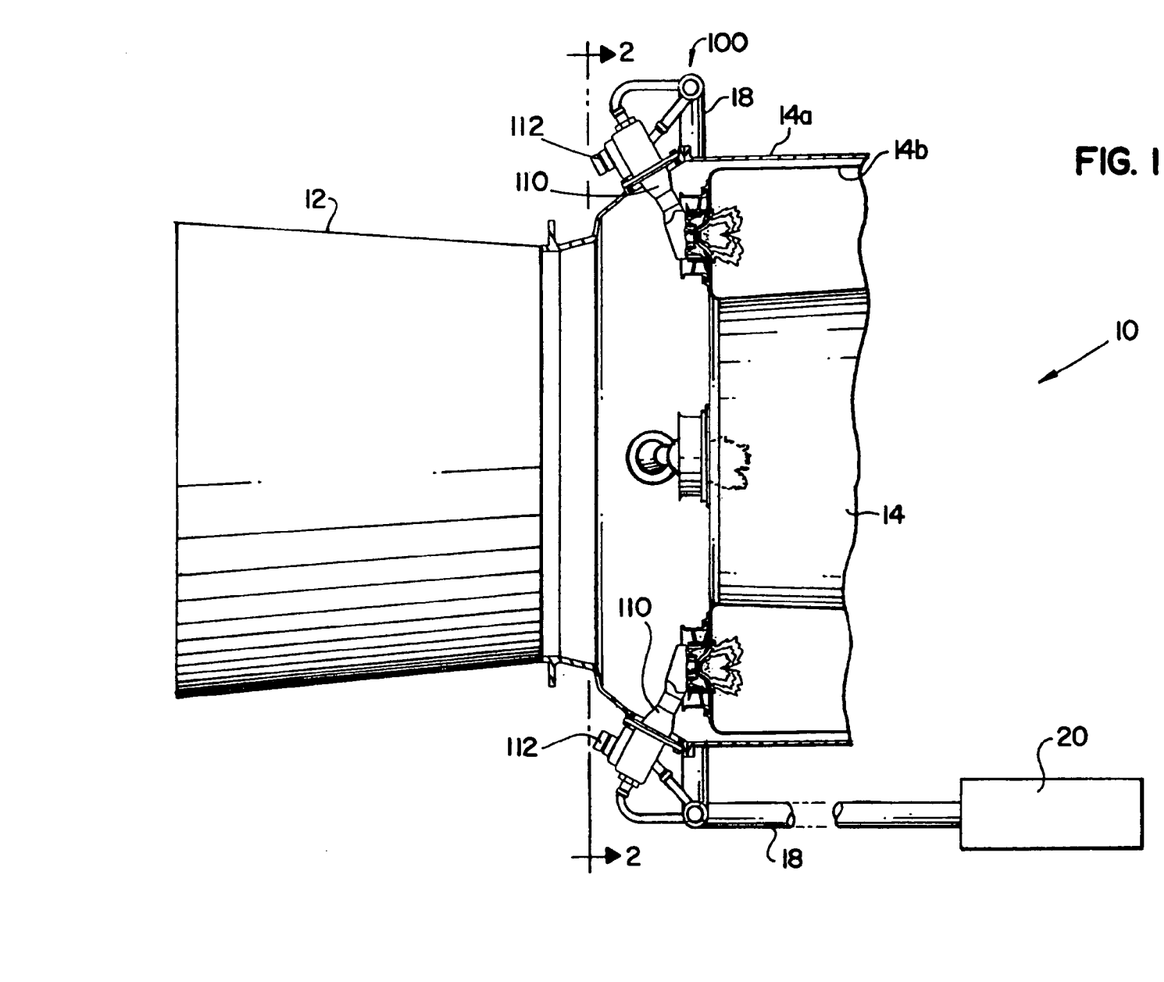
FIG. 1 is a side elevational view of a portion of a gas turbine engine that includes the active combustion control system of the subject invention, wherein the outer casing of the combustor is cut away and the inner liner sectioned to reveal several of the fuel injectors, which form part of the subject invention.

Referring now to the drawings wherein like reference numerals identify similar features or aspects of the subject invention, there is illustrated in FIG. 1 a gas turbine engine 10 that includes, among other things, the active combustion control system of the subject invention, which is designated generally by reference numeral 100. In general, gas turbine engine 10 includes a compressor 12, a combustion chamber 14 downstream from the compressor 12, and a turbine (not shown) downstream from the combustion chamber 14. The combustion chamber 14 includes a generally cylindrical outer combustion liner or casing 14a and a generally annular inner combustion liner 14b. Those skilled in the art will readily appreciate that other combustor configurations are possible, such as, for example, a can-type combustor.

The combustion control system 100 includes a plurality of fuel injectors 110, each mounted to the outer casing 14a of engine 10 for issuing atomized fuel into the inner combustion liner 14b of combustion chamber 14, as depicted. As explained in more detail below, one or more of the fuel injectors 110 of system 100 is instrumented in such a manner so as to facilitate measurement of thermo-chemical characteristics of the flame within combustion chamber 14, oscillating pressure changes within combustion chamber 14, and the fuel flow rate through the injector itself. In addition, as explained in more detail below, a high speed fuel modulation valve 112 is operatively associated each instrumented fuel injector 110 to control the flow of fuel delivered thereto during engine operation.

As shown in FIG. 1, fuel is delivered to the individual fuel injectors 110, and more precisely to the respective modulations valves 112 associated therewith, by way of a distribution manifold 18. In a preferred embodiment of the subject invention, the distribution manifold 18 receives metered amounts of fuel by way of a full authority digital electronic control (FADEC) unit 20. The FADEC unit 20 accepts inputs (e.g., engine operating temperatures and pressures, shaft speeds and torques) from various sensors on or within the turbine engine 10, and commands the position of a primary fuel-metering valve (not shown) based on software control laws developed for the specific engine application. The software control laws are written to optimize power output and drive the gas turbine engine in a safe operating region for a given power command and set of operating conditions. It is envisioned that the FADEC unit can cooperate with combustion control system 100 to actively reducing engine emissions such as NOx.

Figure 2:
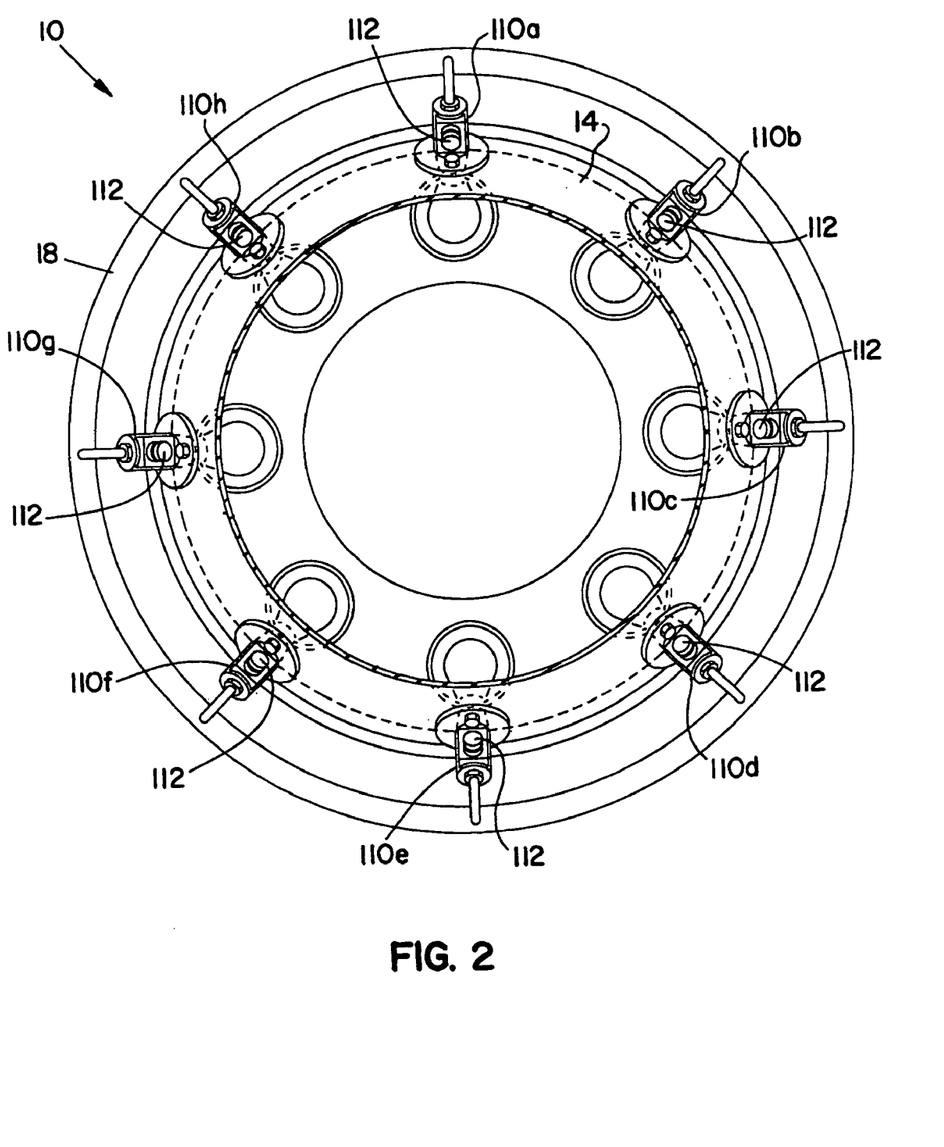
FIG. 2 is a cross-sectional view taken along line 2-2 of FIG. 1, through the combustion chamber of the gas turbine engine, illustrating a plurality of fuel injectors constructed in accordance with a preferred embodiment of the subject invention.

Before turning to the detailed description of the instrumented fuel injectors 110, reference is made to FIG. 2 in which there is illustrated a plurality of instrumented fuel injectors 110a-110h, which are arranged circumferentially about the periphery of the combustion chamber 14. In this arrangement, combustion characteristics including thermo-chemical flame characteristics and acoustic pressure changes can be monitored and measured in a highly localized manner throughout the entire periphery of the combustion chamber 14, by the sensing instrumentation associated with each injector 110a-110h. Thus, in instances wherein the combustion characteristics in a certain location within the combustion chamber 14 are detected or otherwise measured relative to certain baseline values, the fuel flow to one or more of the injectors corresponding to that location in the combustor can be actively modulated by a modulation valve 112 associated therewith, so as to stabilize combustion or otherwise tune the engine.

Those skilled in the art should appreciate that the number of injectors shown in FIG. 2 is for illustrative purposes only and should not be deemed to limit the subject disclosure in any manner. Furthermore, it is envisioned that more than one instrumented fuel injector can be associated with a single fuel modulation valve. Thus, while each injector 110a-110h shown in FIG. 2 includes a respective fuel modulation valve 112, it is envisioned that a particular fuel modulation valve 112 can be configured to modulate fuel to plural fuel injectors, for example, to each injector within a particular quadrant or zone of the combustion chamber 14.

Figure 3:
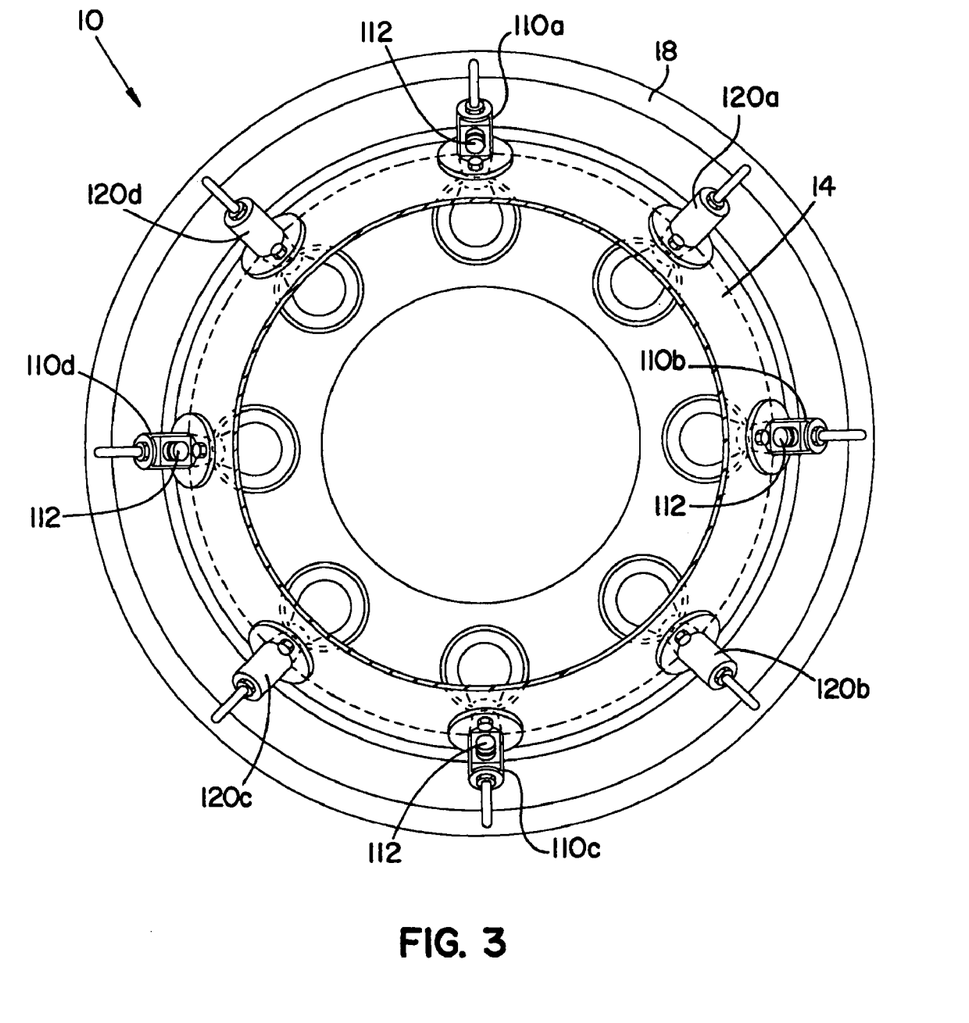
FIG. 3 is also a cross-sectional view taken along line 2-2 of FIG. 1, through the combustion chamber of the gas turbine engine, illustrating an alternative arrangement of fuel injectors, wherein several of the injectors are constructed in accordance with a preferred embodiment of the subject invention and other injectors are constructed in a more conventional manner.

In an alternative injector arrangement illustrated for example in FIG. 3, some of the fuel injectors included in engine 10 are instrumented, while some are not instrumented. In particular, injectors 110a, 110b, 110c and 110d are instrumented so as to operate in accordance with the principles of the subject invention and include respective fuel modulation valves 112. In contrast, fuel injectors 120a, 120b, 120c and 120d are not instrumented, but instead they are configured in a more conventional manner to deliver atomized fuel to the combustion chamber 14 by the instrumented injectors. In such an arrangement, combustion characteristics are monitored and measured within certain combustion zones or quadrants of the combustion chamber 14. It is envisioned that such an arrangement which may be sufficient to actively control combustion in certain, if not many engine applications. In such a configuration, combustion characteristics within a certain combustion zone or quadrant can be actively controlled by modulating fuel flow to one or more of the instrumented injectors 110a-110d associated with that zone or quadrant. This can be accomplished with each instrumented injector 110a-110d having a respective modulation valve 112 as shown, or in the alternative, a modulation valve can be associated with more than one instrumented injector.

Those skilled in the art will readily appreciate that the circumferential position of the instrumented fuel injectors 110 and/or the number of instrumented fuel injectors 110 can vary depending upon the engine configuration and application. Indeed, it is envisioned and well within the scope of the subject disclosure that certain engine applications may only require a single instrumented injector 110, while the remainder of the fuel injectors in the engine are configured to operate in a more conventional manner.

Figure 4A:
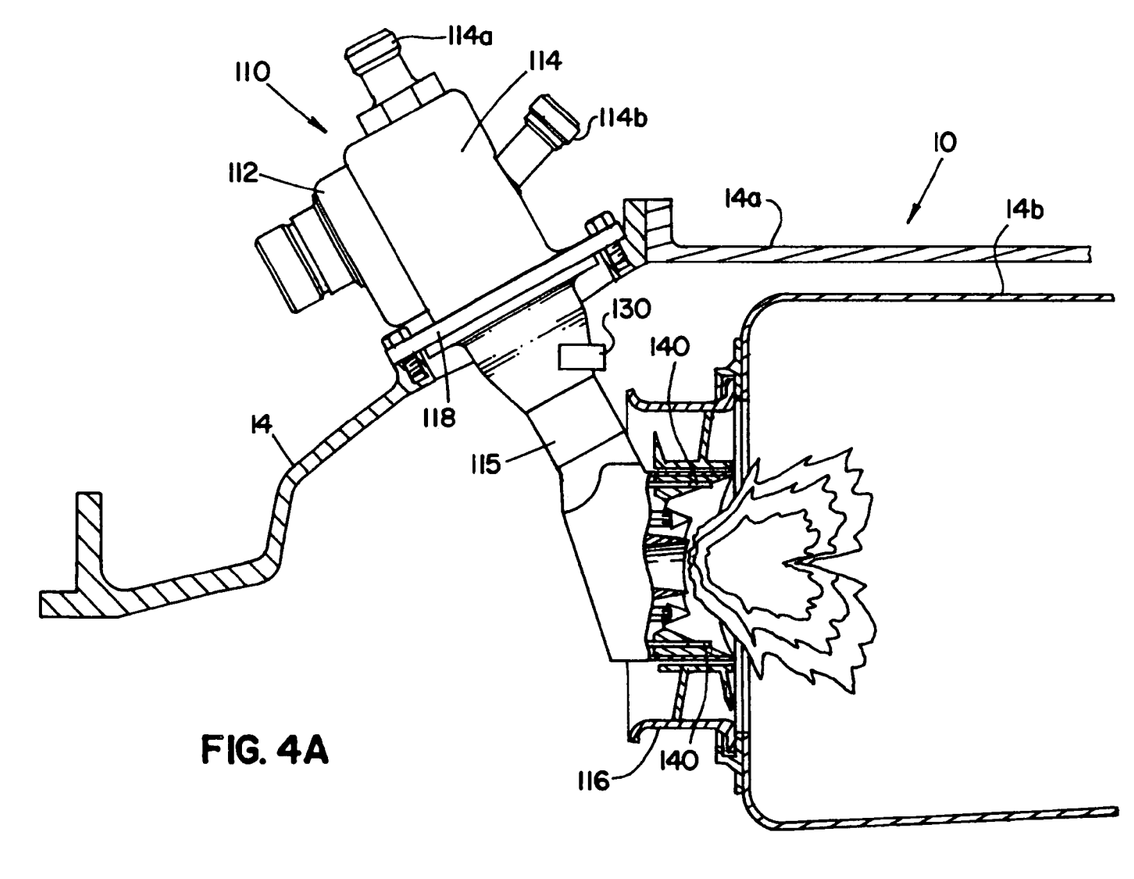
FIG. 4A is a side elevational view of a fuel injector constructed in accordance with a preferred embodiment of the subject invention, wherein a dynamic pressure sensor is positioned on the injector body, and wherein the fuel nozzle is shown in cross-section to illustrate the location of the optical flame sensors.

Referring now to FIG. 4A, there is illustrated an instrumented fuel injector 110 constructed in accordance with a preferred embodiment of the subject invention. Fuel injector 110 includes an inlet end portion 114 having fuel inlet fittings 114a and 114b for receiving fuel from distribution manifold 18. The fuel modulation valve 112 is housed in or otherwise operatively associated with inlet end portion 114 and is in fluid communication with the inlet fittings 114a, 114b.

Fuel injector 110 further includes a main body portion defined by a support strut or feed arm 115 that depends angularly from the inlet end portion 114. A fuel nozzle 116 depends from the lower end portion of feed arm 115 for issuing atomized fuel to the combustion chamber 14. A flange 118 is provided at the upper end portion of feed arm 115 for mounting the fuel injector 110 to the outer casing 14a of the gas turbine engine 10. In operation, internal fuel conduits (not shown) deliver modulated fuel flow from the valve assembly 112, through the feed arm 115 to the fuel nozzle 116.

Fuel injector 110 is adapted and configured to deliver atomized fuel into the inner combustion liner 14b of combustion chamber 14 under varying operating conditions including steady state flow and at controlled fuel flow modulation frequencies. Preferably, fuel injector 10 is adapted and configured for lean direct injection. However, those skilled in the art will readily appreciate that the fuel injector of the subject invention can be configured for a variety of fuel atomization applications.

In general, there are two primary types of atomizing fuel injectors, and either type of injector may be employed with the active combustion control system 10 of the subject invention. These devices include swirl pressure atomizers, which derive energy for atomization from fuel pressure, and air blast atomizers, which derive energy for atomization from high velocity compressor air. Examples of atomizing fuel injectors are disclosed in U.S. Pat. No. 6,688,534 to Bretz, the disclosure of which is incorporated herein by reference in its entirety.

With continuing reference to FIG. 4A, the instrumented fuel injector 110 includes a dynamic pressure sensor 130 for measuring acoustic pressure differentials within the combustion chamber 14 of turbine engine 10, and a flame sensor or optical sensor array 140 for observing flame characteristics within the combustion chamber 14 of turbine engine 10. The dynamic pressure sensor 130 is located or otherwise supported on the feed arm 115 of fuel injector 110, upstream from the inner combustion liner 14b. Dynamic pressure sensor 130 is adapted and configured to detect thermo-acoustic pressure oscillations in the compressed air flowing through the combustion chamber 14.

Preferably, the dynamic pressure sensor 130 is in the form of an acoustic microphone that employs a piezoelectric dynamic pressure sensor. Importantly, the dynamic pressure sensor 130 is supported with a protective enclosure that is adapted for high temperature operation within the combustion chamber 14 of a gas turbine engine 10. The location of the dynamic pressure sensor 130 on the feed arm 115 can vary, so long as the sensor is adequately positioned with respect to the direction of the flow of air through combustion chamber 14.

An example of a dynamic pressure sensor is disclosed in U.S. Pat. No. 6,928,878 to Eriksen et al., which is incorporated herein by reference in its entirety. An example of a temperature resistant semiconductor support framework for a dynamic pressure sensor is disclosed in U.S. Pat. No. 6,773,951 to Eriksen et al., the disclosure of which is also herein incorporated by reference in its entirety. It is envisioned and well within the subject disclosure that alternative high temperature dynamic pressure sensors may be employed in the active combustion control system 10 of the subject invention including, for example, PCB sensors and Vibrometers.

With continuing reference to FIG. 4A, the flame sensor 140 of the instrumented fuel injector 110 preferably includes an optical sensor array disposed within the fuel nozzle 116 for detecting flame characteristics relating to combustion instability. In particular, the flame sensor or optical sensor array 140 is adapted and configured to detect spectral and/or thermal characteristics of the combustor flame that occur downstream from the nozzle 116. In this embodiment, the optical sensor array 140 includes a plurality of light guides rods, such as, for example, sapphire rods that extend from a leading surface of fuel nozzle 116. An example of an optical sensor array constructed in this manner is disclosed in U.S. Patent Application Publication 2006/0000219 to Myhre, the disclosure of which is herein incorporated by reference in its entirety.

It is also envisioned and well within the scope of the subject disclosure that the optical sensor array 140 of fuel injector 110 can be employed to measure the frequency of heat release during the combustion process. Often, the heat release frequency is at a harmonic or sub-harmonic of the characteristic acoustic frequency. This is the frequency that the heat release couples to the combustor acoustics. The system 100 can more effectively control the combustion process if instability can be controlled at the driving frequency of the heat release.

Figure 4B:
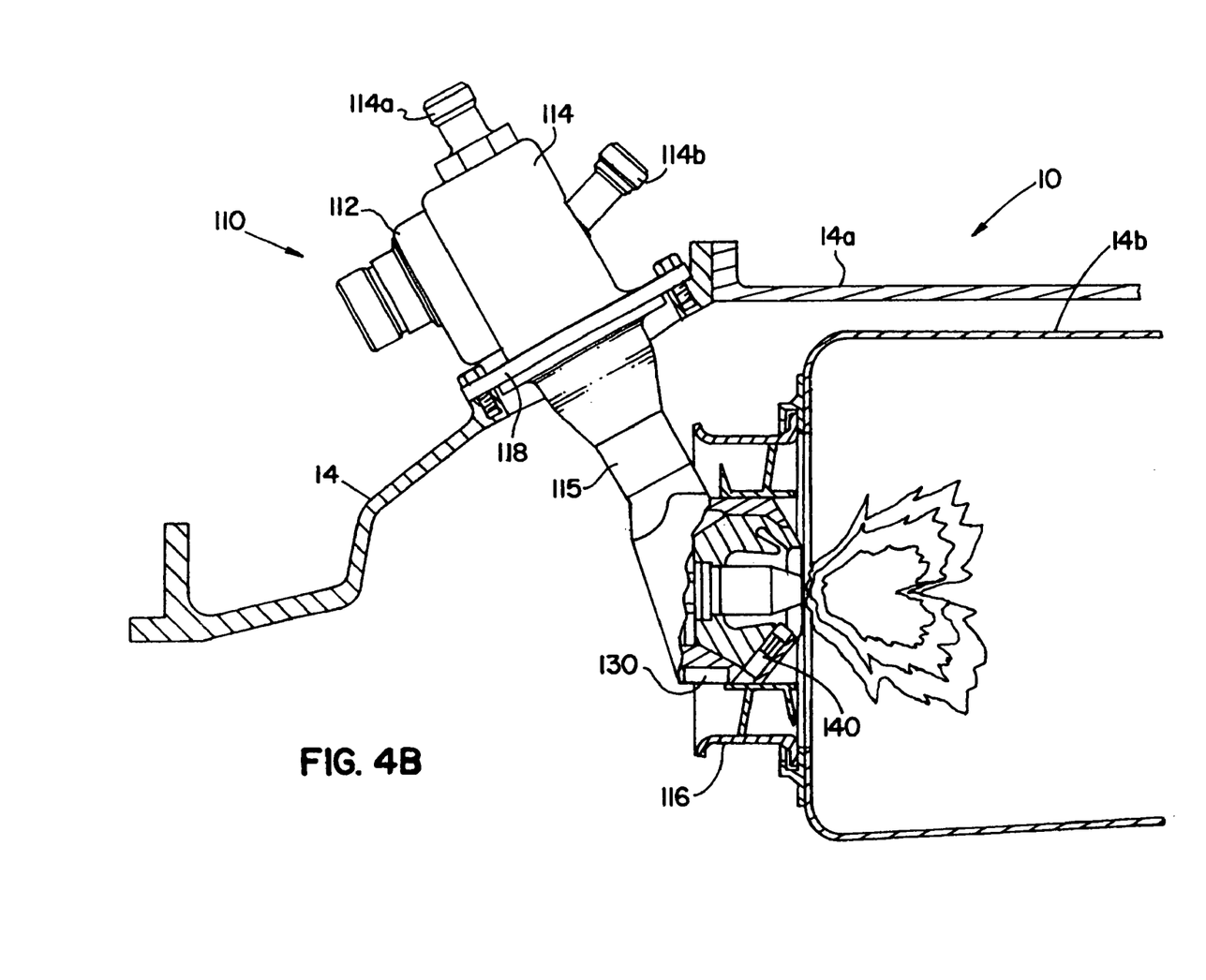
FIG. 4B is a side elevational view of another fuel injector constructed in accordance with a preferred embodiment of the subject invention, wherein the fuel nozzle is shown in cross-section to illustrate the location of the dynamic pressure sensor and optical flame sensors.

Referring now to FIG. 4B, there is illustrated another embodiment of the instrumented fuel injector 110. In this embodiment of the subject invention, the dynamic pressure sensor 130 is not located on the feed arm 115 of the injector 110, but instead, it is located or otherwise supported within the fuel nozzle 116 of fuel injector 110. Furthermore, in this embodiment of the subject invention, the flame sensor or optical sensor array 140 includes one or more optical fiber bundles extending from a leading surface of the nozzle 116. An example of an optical sensor array constructed in this manner is disclosed in U.S. Patent Application Publication 2005/0247066 to Myhre, the disclosure of which is herein incorporated by reference in its entirety.

Figure 5:
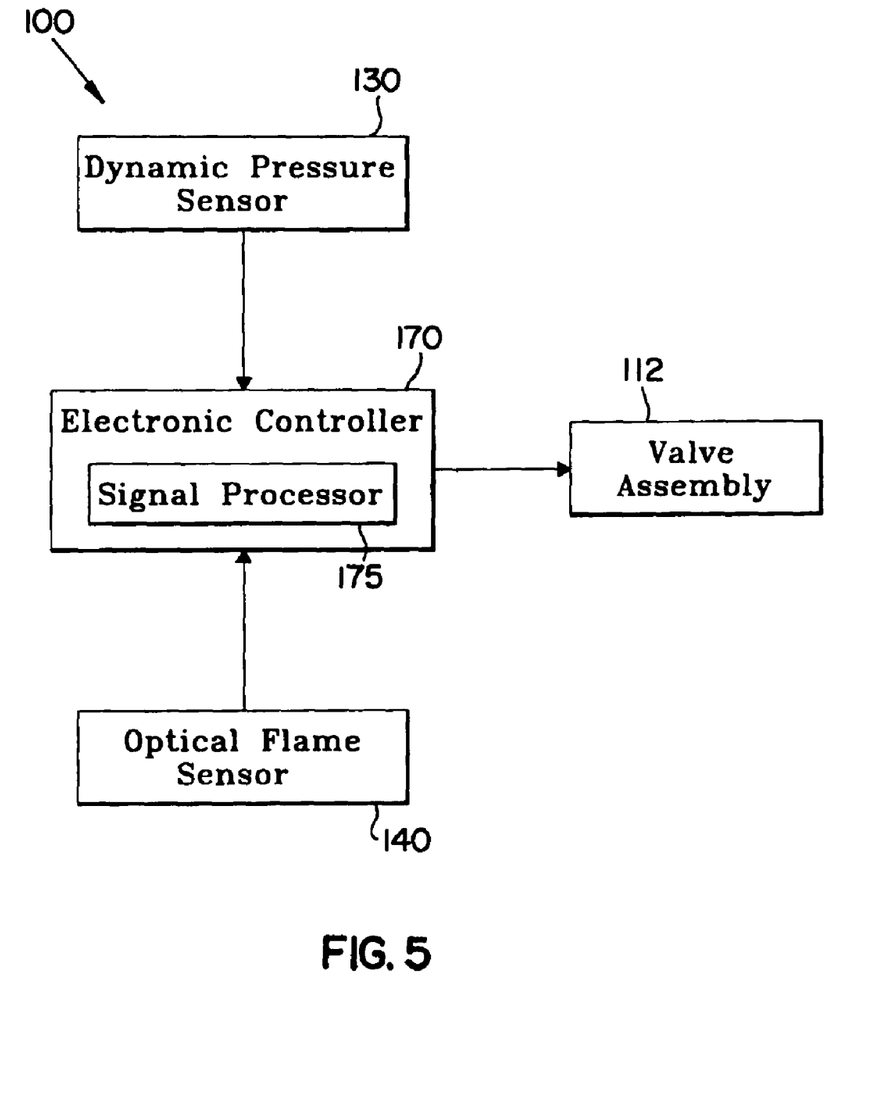
FIG. 5 is a flow chart illustrating the flow of information between the sensors disposed within the fuel injector of FIG. 4 and an electronic controller which forms part of the subject invention and which communicates with a valve assembly that delivers fuel to the fuel injector at a commanded flow rate, based upon input from the sensors.

Referring to FIG. 5, in operation, the dynamic pressure sensor 130 of an instrumented fuel injector 110 provides an output signal indicative of a pressure measurement to an electronic controller 170, which analyzes the signal using signal processor 175. Based upon the signal analysis, controller 170 commands the modulation valve 112 associated with injector 110 to modulate fuel flow to the injector 110 in a manner that maintains combustion stability, at least locally within the zone of the combustor with which the injector is associated.

In operation, the flame sensor or optical sensor array 140 provides an output signal to the signal processor 175 associated with electronic controller 170, which is analyzed by a spectrometer or similar device. The spectrometer is configured to derive flame quality parameters relating to combustion stability. These parameters include, for example, flame intensity, flame stability and flame temperature, as well as the presence of fuel contaminants, and chemical emissions or radicals effecting combustion stability. The controller 170 provides commands to the valve assembly 112 associated with fuel injector 110 based upon the analyzed signal from flame sensor 140, so as to modulate fuel flow to injector 110 and thereby maintain combustion stability.

Each instrumented fuel injector 110 of the active combustion control system 100 of the subject invention may include a fuel flow sensor for monitoring fuel flow rates at each fuel injector. The fuel flow sensors are preferably adapted and configured to operate at line pressures of between 200 to 1500 psi, and are designed to cover a range of fuel flow from 25% to 100% and a modulation of about ±20% of the average mean fuel flow to the nozzle. The location of the fuel flow sensor within the fuel injector can vary, as long as it is positioned to provide a precise measurement of the fuel flowing to the nozzle.

Although it is envisioned that each sensor in fuel injector 110 can directly communicate with the electronic controller 170, as depicted in FIG. 5, it is envisioned that a sensor interface may be disposed within each injector 10 for receiving input signals from the dynamic pressure sensor 130 and the flame sensor 140, as well as other sensors that may be included in or on the fuel injector. The sensor interface would be adapted and configured to communicate with the electronic controller 170, which in turn is adapted and configured to communicate with the modulating valve assembly 112. It is envisioned that the sensor interface would include digital communication features for communicating with the electronic controller 170.

As described briefly above, at least one injector 110, and preferably each injector 110, includes a high speed fuel modulation valve 112 adapted and configured to modulate fuel flow to the injectors 110 in response to combustion instability detected by dynamic pressure sensor 130 and/or flame sensor 140. More particularly, fuel modulation valve 112 is configured to modulate fuel flow in proportion to detected combustion instability up to about ±20% of the mean fuel flow, at a frequency of up to 1000 Hz. U.S. application Ser. No. 11/321,203 to Cornwell et al., which is herein incorporated by reference in its entirety, discloses three embodiments of a high speed fuel modulation valve configured for use in conjunction with the instrumented fuel injectors 110 of combustion control system 100.

The three modulating valve assemblies disclosed in the Cornwell et al. application are in the form of latching oscillating valve assemblies. Each valve assembly has a different construction, but all three function in a similar manner to actively control or otherwise modulate the flow of fuel to a fuel injector issuing fuel to the combustor of a gas turbine engine. The basic operational similarity between the three valve assemblies is that the valve members operate at a resonance frequency to minimize energy requirements. The energy used to oscillate a valve member of the valve assembly between operational positions is stored in a mechanical spring. The type of spring and the relative configuration of the valve assembly is what make each of the three valve assemblies different from one another.

In addition, the three modulating valve assemblies are similar in that each valve member reverts to a mean or neutral fuel flow condition if there is a loss of power, and each valve assembly is designed so that the mean fuel flow does not shift when flow is modulated. In operation, the fuel modulation that is achieved by the valve assemblies is proportional to the amplitude of the combustion instability that is detected and present in the combustor during operation. The amplitude of fuel modulation or the fuel flow rate is varied using multiple valve units operating in concert with each other, with each valve member in a particular valve assembly having a distinct fuel flow. The oscillation frequency of a valve member is varied by adjusting the time period during which the valve member is magnetically latched in an operational position, and phase is shifted by timing the release of the valve member from a latched position.

The three valve assemblies are designed to operate at a temperature of up to at least about 230° C. and at a very high operational frequency of about 1000 Hz or greater. The valves preferably have an operational life of about 30 billion cycles (i.e., 17,000 operational hours at 500 Hz). The valve assemblies are designed with fluidic or hydraulic bearings so that there is no metal-to-metal contact or friction with respect to the oscillating valve components and they have a mass that is preferably less than about 250 grams.

It is also envisioned and well within the scope of the subject disclosure that alternative types of valve actuators could be utilized with the active combustion control system 100 of the subject invention, to modulate or otherwise deliver pulsed fuel flow to the instrumented injectors 110. These include, for example, magneto-strictive valve actuators, piezoelectric valve actuators, valve actuators employing cavitating piezoelectric fuel modulation, MEMS type actuators (thermal, fluid or mechanical amplifiers), electro-dynamic valve actuators, and rotary-type valve actuators.

Although the active combustion control system of the subject invention and each of the components thereof, has been described with respect to preferred embodiments, those skilled in the art will readily appreciate that changes and modifications may be made thereto without departing from the spirit and scope of the subject invention as defined by the appended claims.

What is claimed is:

1. A system for actively controlling combustion in a combustion chamber of a gas turbine engine comprising:
    a) a fuel injector for issuing fuel into a combustion chamber of a gas turbine engine, the fuel injector including:
        i) a dynamic pressure sensor for measuring pressure differentials within the combustion chamber; and
        ii) a flame sensor for observing flame characteristics within the combustion chamber;
    b) a valve assembly for controlling flow of fuel to the injector; and
    c) an electronic controller operatively associated with the fuel injector for commanding the valve assembly to deliver fuel to the fuel injector at a commanded flow rate, based upon input from the sensors of the fuel injector.

2. A system as recited in claim 1, comprising a plurality of fuel injectors, wherein at least one of the fuel injectors includes a dynamic pressure sensor and a flame sensor.

3. A system as recited in claim 2, wherein each of the fuel injectors includes a dynamic pressure sensor and a flame sensor.

4. A system as recited in claim 3, comprising a plurality of valve assemblies, wherein each valve assembly is operatively associated with at least one fuel injector.

5. A system as recited in claim 3, wherein each of the fuel injectors has a valve assembly operatively associated therewith.

6. A system as recited in claim 2, wherein each fuel injector having a dynamic pressure sensor and a flame sensor, also has a valve assembly operatively associated therewith.

7. A system as recited in claim 1, wherein the fuel injector includes an injector body having a nozzle for issuing atomized fuel into the combustion chamber of a gas turbine.

8. A system as recited in claim 7, wherein the dynamic pressure sensor is located within the nozzle.

9. A system as recited in claim 7, wherein the dynamic pressure sensor is located on the injector body.

10. A system as recited in claim 1, wherein the dynamic pressure sensor is adapted and configured to detect thermo-acoustic pressure oscillations.

11. A system as recited in claim 1, wherein the dynamic pressure sensor comprises a piezoelectric dynamic pressure sensor.

12. A system as recited in claim 10, wherein the dynamic pressure sensor is supported within a protective enclosure adapted for high temperature operation within the combustion chamber of a gas turbine engine.

13. A system as recited in claim 1, wherein the flame sensor comprises an optical sensor array disposed within the nozzle.

14. A system as recited in claim 13, wherein the optical sensor array is adapted and configured to detect spectral characteristics of the combustor flame downstream from the nozzle.

15. A system as recited in claim 13, wherein the optical sensor array is adapted and configured to detect thermal characteristics of the combustor flame downstream from the nozzle.

16. A system as recited in claim 13, wherein the optical sensor array comprises a plurality of optical fiber bundles.

17. A system as recited in claim 13, wherein the optical sensor array comprises a plurality of light guide rods.

18. A system as recited in claim 1, wherein the valve assembly is adapted and configured to modulate the fuel flow rate within a predefined range, about an average fuel flow rate.

19. A system for actively controlling combustion in a combustion chamber of a gas turbine engine, comprising:
    a) a plurality of fuel injectors each having an injector body with a nozzle for issuing atomized fuel into a combustion chamber of a gas turbine engine, each fuel injector including:
        i) a dynamic pressure sensor for measuring acoustic pressures within the combustion chamber;
        ii) a flame sensor for detecting combustor flame characteristics within the combustion chamber; and
    c) a valve assembly operatively associated each fuel injector for controlling fuel flow through the fuel injector; and
    d) an electronic controller operatively associated with the plurality of fuel injectors for commanding the valve assembly associated with each fuel injector to deliver fuel to the fuel injector associated therewith at a commanded flow rate, based upon input from the sensors thereof.

20. A system as recited in claim 19, wherein the dynamic pressure sensor of each fuel injector is positioned on the injector body to detect thermo-acoustic pressure oscillations.

21. A system as recited in claim 19, wherein the dynamic pressure sensor of each fuel injector is positioned in the nozzle to detect thermo-acoustic pressure oscillations.

22. A system as recited in claim 19, wherein the dynamic pressure sensor of each fuel injector comprises a piezoelectric dynamic pressure sensor.

23. A system as recited in claim 22, wherein the dynamic pressure sensor of each fuel injector is supported with a protective enclosure adapted for high temperature operation within the combustion chamber.

24. A system as recited in claim 19, wherein the flame sensor of each fuel injector comprises an optical sensor array.

25. A system as recited in claim 24, wherein the optical sensor array of each fuel injector is adapted and configured to detect spectral characteristics of the combustor flame downstream from the nozzle.

26. A system as recited in claim 24, wherein the optical sensor array of each fuel injector is adapted and configured to detect thermal characteristics of the combustor flame downstream from the nozzle.

27. A system as recited in claim 24, wherein the optical sensor array of each fuel injector comprises a plurality of optical fiber bundles.

28. A system as recited in claim 24, wherein the optical sensor array of each fuel injector comprises a plurality of sapphire rods.

29. A system as recited in claim 19, wherein each valve assembly is adapted and configured to modulate the fuel flow rate within a predefined range, about an average fuel flow rate.

* * * * *